US009878797B2

(12) United States Patent
Ambite Iglesias

(10) Patent No.: US 9,878,797 B2
(45) Date of Patent: Jan. 30, 2018

(54) ALIGNMENT AND SAFETY DEVICE FOR THE COWLS OF AIRCRAFT ENGINE NACELLES

(71) Applicant: Airbus Defence and Space S.A., Getafe, Madrid (ES)

(72) Inventor: Juan Carlos Ambite Iglesias, Getafe (ES)

(73) Assignee: Airbus Defence and Space S.A., Getafe, Madrid (ES)

( * ) Notice: Subject to any disclaimer, the term of this patent is extended or adjusted under 35 U.S.C. 154(b) by 266 days.

(21) Appl. No.: 14/869,314

(22) Filed: Sep. 29, 2015

(65) Prior Publication Data
US 2016/0090185 A1 Mar. 31, 2016

(30) Foreign Application Priority Data

Sep. 29, 2014 (EP) .................................... 14382374

(51) Int. Cl.
B64B 1/24 (2006.01)
B64D 27/00 (2006.01)
B64D 29/00 (2006.01)
B64D 31/00 (2006.01)
B64D 33/00 (2006.01)
B64D 35/00 (2006.01)
B64D 29/08 (2006.01)
B64D 29/06 (2006.01)

(52) U.S. Cl.
CPC ............ B64D 29/08 (2013.01); B64D 29/06 (2013.01)

(58) Field of Classification Search
CPC ................................ B64D 29/08; B64D 29/06
See application file for complete search history.

(56) References Cited

U.S. PATENT DOCUMENTS

| 3,061,349 | A | * | 10/1962 | Dellith | B64D 29/06 292/304 |
| 5,915,765 | A | | 6/1999 | Sternberger | |
| 6,334,588 | B1 | * | 1/2002 | Porte | B64D 29/06 244/129.4 |
| 6,666,408 | B1 | | 12/2003 | De Carvalho et al. | |

(Continued)

FOREIGN PATENT DOCUMENTS

WO WO 2014/076434 A1 5/2014

OTHER PUBLICATIONS

European Search Report for Application No. 14382374.8 dated Apr. 22, 2015.

*Primary Examiner* — Philip J Bonzell
(74) *Attorney, Agent, or Firm* — Jenkins, Wilson, Taylor & Hunt, P.A.

(57) ABSTRACT

The disclosure herein provides an alignment and safety device for the cowls of the nacelle of an aircraft engine formed by first and second parts to be arranged opposite of each other at the lower edges of the cowls that include first and second alignment arms configured with a portion arranged to enter inside the inner space of the nacelle covered by the opposite cowl. One of the parts includes a blocking member configured to be interposed between the cowls after being unlatched to facilitate their opening operation and also when they return to the closed position from an open position if they are misaligned to facilitate its alignment and subsequent latching applying a force F on the blocking member.

10 Claims, 4 Drawing Sheets

(56) References Cited

U.S. PATENT DOCUMENTS

| | | | |
|---|---|---|---|
| 7,661,321 B2* | 2/2010 | Isebrand | B64D 29/06 73/801 |
| 8,191,822 B2 | 6/2012 | Gallego Pleite et al. | |
| 2012/0217372 A1 | 8/2012 | Vauchel et al. | |
| 2015/0274308 A1 | 10/2015 | Renault | |

* cited by examiner

ALIGNMENT AND SAFETY DEVICE FOR THE COWLS OF AIRCRAFT ENGINE NACELLES

CROSS-REFERENCE TO RELATED APPLICATION

This application claims priority to European Application Serial No. 14382374.8 filed Sep. 29, 2014 the disclosure of which is incorporated herein by reference in its entirety.

TECHNICAL FIELD

The disclosure herein relates to the cowls of aircraft engine nacelles and more in particular to a device for facilitating their opening and closing operations in ground.

BACKGROUND

The nacelle of aircraft engines, particularly turbofan engines, comprises right and left cowls having a C-shaped cross section in a transverse plane perpendicular to the longitudinal axis of the engine covering internal parts of it that shall be operable to provide access to internal components of the engine for maintenance purposes. The upper edges of both cowls are articulated in the upper part of the engine by a hinge. When the aircraft is in flight, the cowls are closed ensuring aerodynamic continuity of the nacelle. The lower edges of the cowls are provided with latching mechanisms that latch the cowls in their closed position when the mechanisms are actuated.

The latching mechanisms are formed by cooperating male and female parts mounted on the respective lower edges of the cowls. In order to avoid an operator forgetting to actuate them when the cowls are in the closed position the nacelle is usually provided with a closure fault indicator.

U.S. Pat. No. 6,666,408 B1 discloses a closure fault indicator comprising retractable abutment members automatically maintaining the cowls spaced from one another in a visible manner, when the cowls are moved from their open position into their closed position after having finished engine maintenance tasks.

Another closure fault indicator is disclosed in US 2010/006701 A1.

Although the solutions proposed by the prior art for latching the cowls have avoided some of the problems involved in their opening and closing operations some unresolved problems remain.

One of them is that the separation between the cowls after being unlatched does not provide enough space to the operator for an easy manipulation of the cowls in the opening operation.

Another problem is that the cowls may be misaligned in its closed position due to its large size which implies the need of manual alignment operations by the operator so that they can be latched.

This disclosure herein is addressed to the solution of the problems.

SUMMARY

The disclosure herein provides an alignment and safety device for the cowls of the nacelle of an aircraft engine formed by first and second parts to be arranged opposite of each other at the lower edges of the cowls. Both parts comprise first and second alignment arms configured with a portion arranged to enter inside the inner space of the nacelle covered by the opposite cowl. One of the parts comprises a blocking member configured to be interposed between the cowls after being unlatched to facilitate their opening operation. The blocking member is also configured to be interposed between the cowls after returning to the closed position from an open position if they are misaligned to facilitate its alignment and subsequent latching applying a force F on the blocking member for displacing it towards the inner space of the nacelle covered by the opposite cowl.

In an embodiment, the blocking member is formed by a third arm, joined to the first or the second alignment arm in a rotatable manner of predetermined amplitude, with a bumper at its end, particularly of an elastomeric material, to absorb impacts.

In an embodiment, the first and second alignment arms are mounted on base plates and the portions are protruding portions with respect to the base plates having a lower edge configured, particularly, with a first section elevated with respect to the surface of the base plates and a second section inclined upwardly as a ramp.

In an embodiment, the cowls are made of a composite material and the base plates are made of a metallic material. The configuration of the base plates includes end flanges for covering the lower edges of the cowls to protect them against impacts.

Other characteristics and advantages of the present disclosure will be clear from the following detailed description of embodiments illustrative of its object in relation to the attached figures.

DETAILED DESCRIPTION

Figure 1:
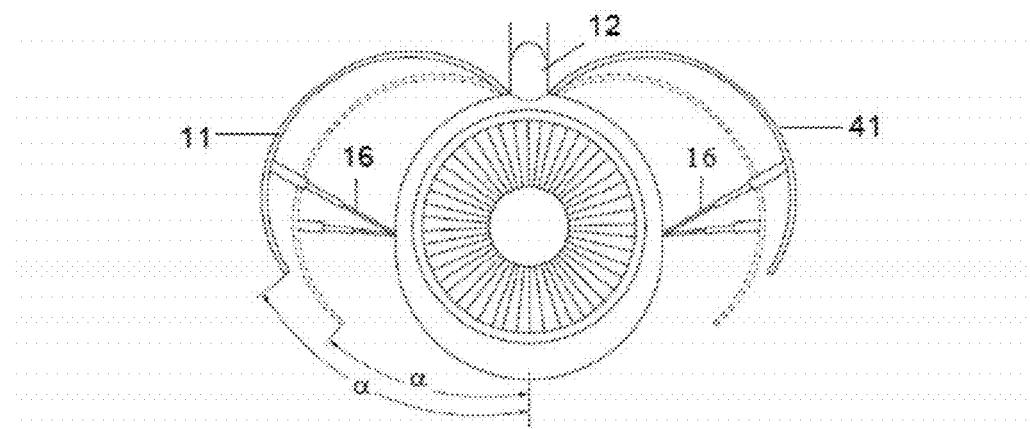
FIG. 1 is a schematic front view of an aircraft engine with the cowls in two opened positions.
Figure 2:
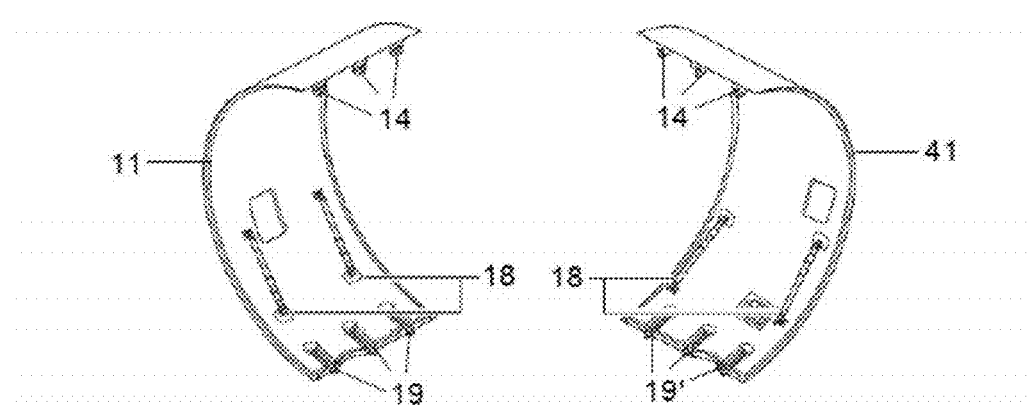
FIG. 2 is a schematic perspective view of the cowls of an aircraft engine.

As illustrated in FIGS. 1 and 2, the nacelle of an aircraft turbofan engine mounted beneath the wing of an aircraft comprises two cowls 11, 41 having a C-shaped cross section in a transverse plane perpendicular to the longitudinal axis of the engine.

The cowls 11, 41 are articulated by its upper edge through hinges 14 to a strut 12 by which the engine is suspended of the wing so that they can be raised to give access to the engine. The opening operation to achieve a desired opening angle □ is made manually. The operators use telescopic bars 16 to keep the cowls 11, 41 in the desired opening position to perform maintenance tasks connecting the free end of the bars 16 to the engine. After finishing the maintenance tasks the operators engage the end of the bars 16 to its original position 18 in the cowls 11, 41 and these are moved by operators to their closed position where they are latched using cooperating latches 19, 19' arranged at their lower edges.

The present disclosure proposes incorporating an alignment and safety device 20 to the cowls 11, 41 with the following purposes for example:

Facilitate the opening operation of the cowls 11, 41 to the operators.

Facilitate the alignment of the cowls 11, 41 in the closed position.

Absorbing impacts during the closing operation of the cowls 11, 41.

Acting as a fault closure indicator.

Figure 3:
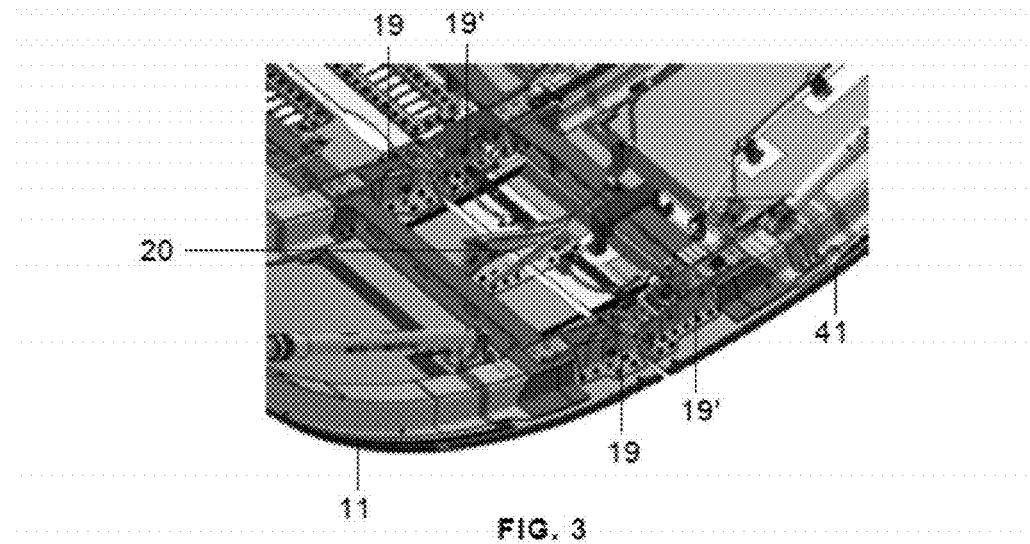
FIG. 3 is a perspective view of the inside of a bottom portion of two cowls of an aircraft engine in a latched position with an alignment and safety device according to the present disclosure.

An embodiment of the alignment and safety device 20, disposed between two pairs of latches 19, 19' of the cowls 11, 41, is shown in FIG. 3.

Figure 4A:
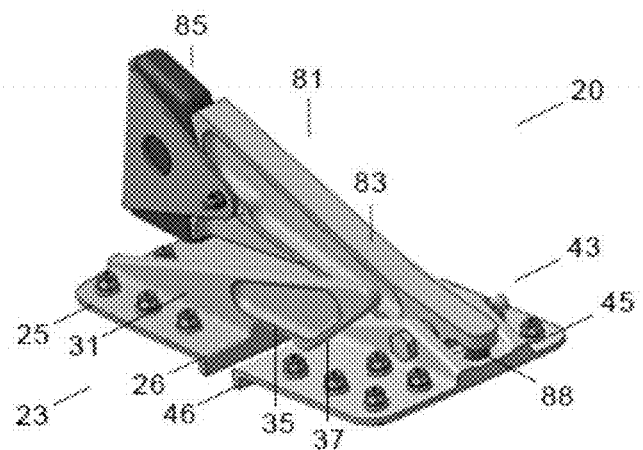
FIGS. 4A, 4B and 4C are three perspective views of an embodiment of the alignment and safety device according to the present disclosure.
Figure 4B:
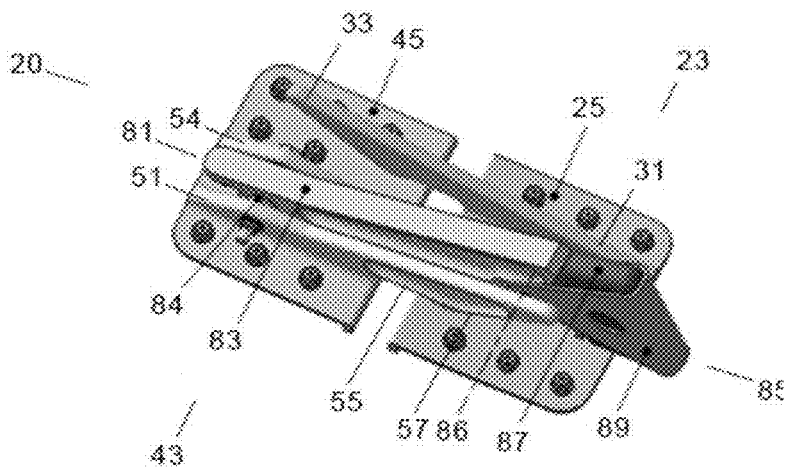
Figure 4C:
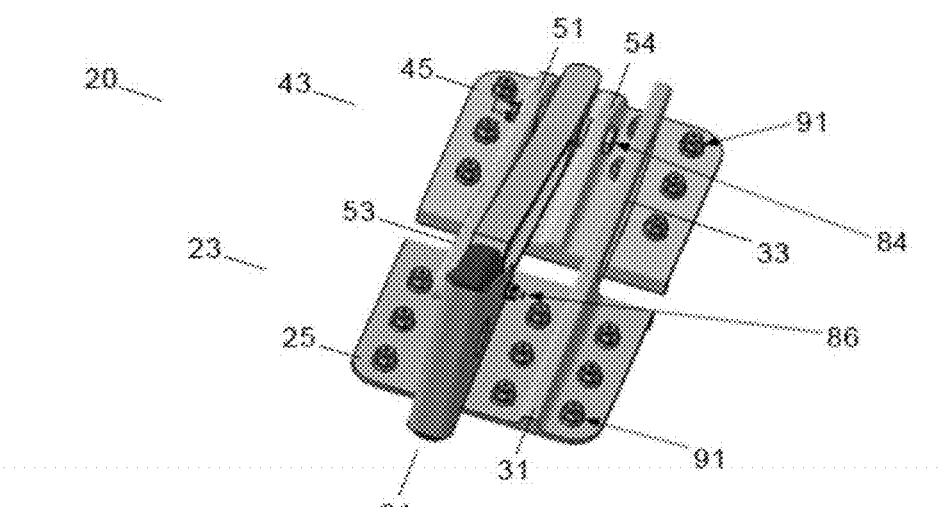

In the embodiment illustrated in FIGS. 4A, 4B and 4C the alignment and safety device 20 comprises first and second parts 23, 43 shown in the same way it would be mounted on the lower edges of the cowls 11, 41 when they are in a closed position. The first and second parts 23, 43 are joined to the cowls 11, 41 by a number of bolts 91. It should be noted that between the first and second parts 23, 43 of the alignment and safety device 20 there is a gap for the ventilation and tolerance absorption of the motor during operation.

The first part 23 comprises a base plate 25 on which a first alignment arm 31, configured with a protruding portion 33 with respect to the base plate 25, is disposed.

The second part 43 comprises a base plate 45 on which a second alignment arm 51, configured with a protruding portion 53 with respect to the base plate 45, is disposed and a blocking member 81, formed by a third arm 83 and a bumper 85 on its end attached in a rigid manner by a shaft 86. The bumper 85 is formed by a block 87 of elastomeric material and a protective jacket 89.

The blocking member 81 could also be mounted on the first part 23 of the alignment and safety device 20.

For a better understanding of the fundamental features of the configuration of the various components of the alignment and safety device 20 we will firstly describe its functionality.

Figure 5A:
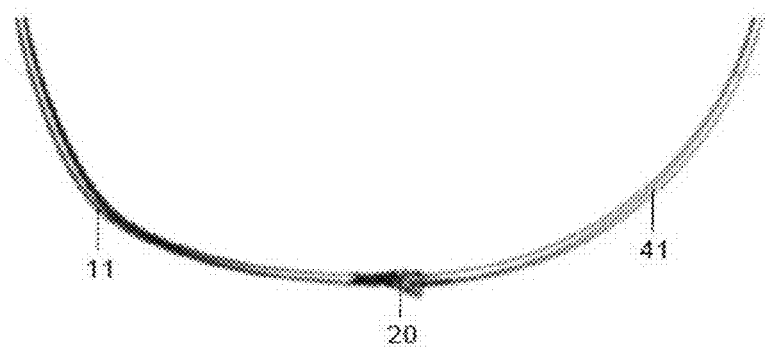
FIGS. 5A and 5B are schematic views of the cowls of an aircraft engine provided with the alignment and safety device of the disclosure herein disposed for its opening.
Figure 5B:
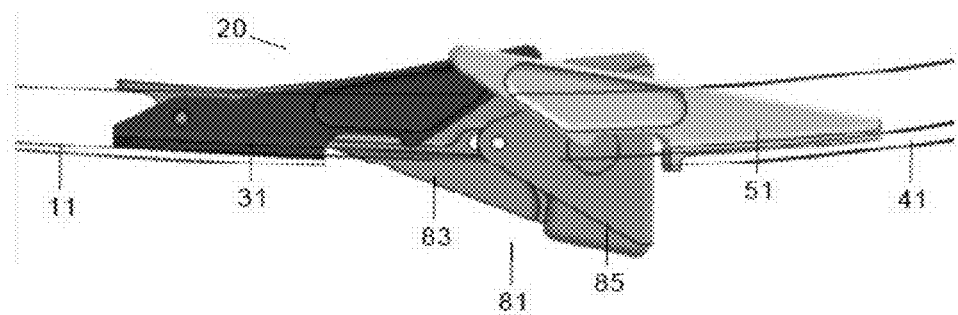
Figure 6:
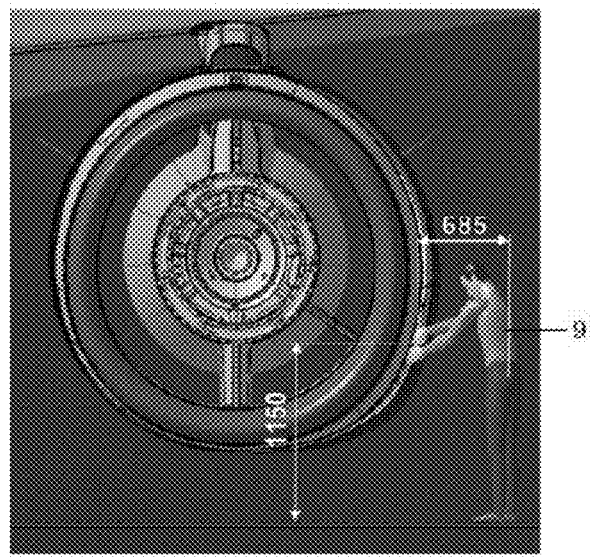
FIG. 6 is a schematic perspective view of the opening operation of the cowls of an aircraft engine provided with the alignment and safety device of the disclosure herein.

The opening operation of the cowls 11, 41 will be now explained in reference to FIGS. 5A, 5B and 6.

When the latches 19, 19' of the cowls 11, 41 are unlatched and the operator slightly opens one of them the blocking member 81 (which in the case shown in FIGS. 5A and 5B is arranged in the first part 23 of the alignment and safety device 20 that is attached to the left cowl 11) is moved downwardly so that at least the bumper 85 remains interposed between the two cowls 11, 41 ensuring their separation and allowing the operator 9 to begin the opening operation of the right cowl 41 in an upright position as illustrated in FIG. 6.

The closing operation of the cowls 11, 41 will now be explained in reference to FIGS. 7A and 7B. In this case the blocking member 81 is arranged in the second part 43 of the alignment and safety device 20 which is attached to the right cowl 41.

Figure 7A:
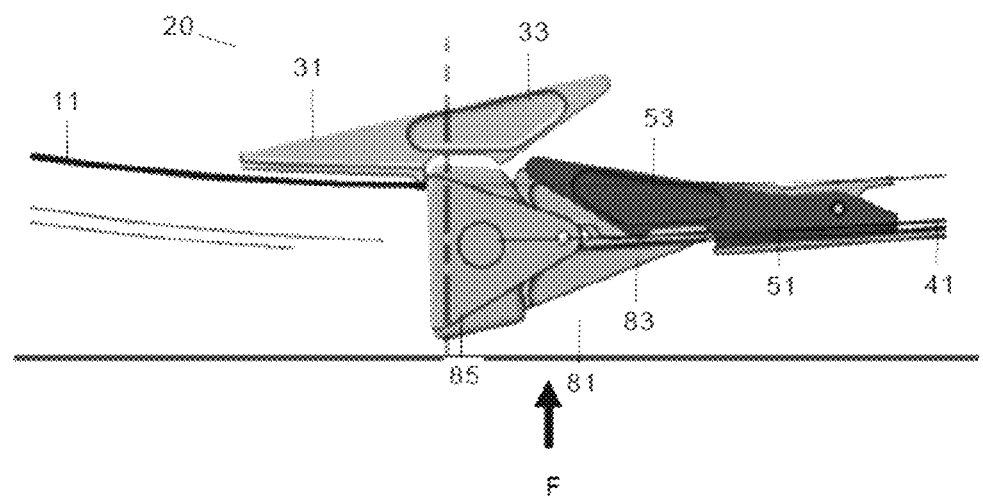
FIGS. 7A and 7B are schematic views of the cowls of an aircraft engine provided with the alignment and safety device of the disclosure herein in a misaligned situation in their closed position before the application of the force F for their alignment.

If after moving the cowls 11, 41 to the closed position the lower edge of the right cowl 41 descend from its theoretical position the alignment and safety device 20 would be disposed in the situation shown in FIG. 7A. The blocking member 81 is interposed between the cowls 11, 41. In this situation, a force F would be applied on it to move it up so that both cowls 11, 41 are free to close and the first and second alignment arms 31, 51 make possible that the right cowl 41 may be aligned with the left cowl 11. The protruding portions 33, 53 of the first and second alignment arms 31, 51 would enter into the interior of the nacelle covered by, respectively, the right cowl 41 and the left cowl 11 and would stay there without touching the base plates 45, 25 (as shown clearly in FIGS. 4A, 4B and 4C) when the cowls are latched ensuring the correct alignment of the cowls 11, 41 and avoiding any transmission of forces between the first and second parts 23, 43.

Figure 7B:
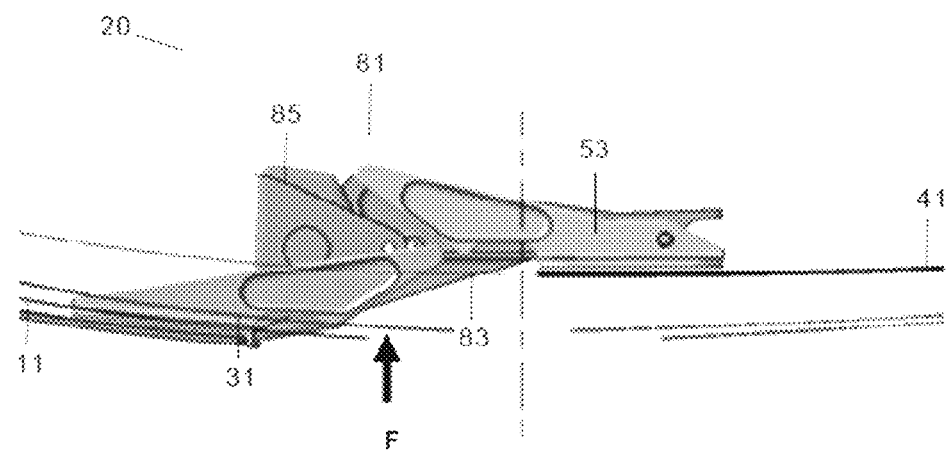

Similarly, if after moving the cowls 11, 41 to the closed position, the lower edge of the left cowl 11 descend from its theoretical position the alignment and safety device 20 would be disposed in the situation shown in FIG. 7B. The blocking member 81 is interposed between the cowls 11, 41. In this situation, a force F would be applied on it to move it up so both cowls 11, 41 are free to close and the first and second alignment arms 31, 51 make possible that the left cowl 11 can be aligned with the right cowl 11.

An additional function of the blocking member 81 is to absorb impacts during closing operations of the cowls 11, 41. For that reason the bumper 85 comprises the block 87 of elastomeric material and a protective jacket 89.

Since the blocking member 81 is interposed between the cowls 11, 41 it generates a gap between them warning the operator that the latches 19, 19' are not closed. When the blocking member is deactivated, the operator will be in position to properly close the latches 19, 19'.

Regarding the configuration of the embodiment of the alignment and safety device 20 shown in FIGS. 4A, 4B and 4C some features can be highlighted.

The lower edge of the protruding portions 33, 53 of the first and second alignment arms 31, 51 is configured to allow the movement to be performed by them during the above-mentioned alignment operations. In particular, their configuration includes a first section 35, 55 elevated from the surface of the base plates 25, 45 and a second section 37, 57 inclined upwardly as a ramp.

The blocking member 81 is configured so that, if it is arranged in the second part 43 of the device (as depicted in FIGS. 4A, 4B and 4C), it can rotate about a shaft 84 attached to the second alignment arm 51 and to a rod 54 mounted on the base plate 45 parallel to it. This rotation is controlled by a compression spring 88 by which the inner end of the third arm 83 is attached to the base plate 45. In its rest position, the bumper 85 of the blocking member 81 is in contact with the base plate 45.

When the above-mentioned force F acts to move the blocking member 81 from an initial position external to the opposite cowl to an internal position to it, overcoming the resistance of the compression spring 88, the blocking member 81 rotates upwardly around the shaft 84 to facilitate its displacement towards the interior of the left cowl 11. The blocking member 81 returns to its rest position when the force F ceases to act.

The base plates 25, 45 shown in FIGS. 4A, 4B and 4C are plates intended for cowls 11, 41 made of composite materials and therefore include end flanges 26, 46 for covering their lower edges to protect them from possible impacts during opening/closing operations.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A nacelle of an aircraft engine, comprising:
   two cowls having a C-shaped cross-section that are movable from a closed position to an open position for carrying out engine maintenance tasks on ground and vice versa at its completion;
   both cowls arranged to leave a gap between their lower edges in the closed position;
   both cowls comprising cooperating latches at their lower edges for latching them in the closed position;
   wherein the cowls comprise first and second parts of an alignment and safety device at their lower edges arranged opposite each other;
   wherein the first and second parts comprise first and second alignment arms configured with a portion arranged to enter inside an inner space of the nacelle covered by the opposite cowl; and
      wherein the first or the second part comprises a blocking member configured so that at least a part of it is interposed between the cowls after being unlatched to facilitate their opening operation and it is also interposed between the cowls after returning to the closed position from an open position if they are misaligned to facilitate their alignment and subsequent latching by applying a force on the blocking member for displacing it towards the inner space of the nacelle covered by the opposite cowl.

2. The nacelle according to claim 1, wherein the first and second alignment arms and the blocking member are arranged parallel to each other in a direction perpendicular to the lower edges of the cowls.

3. The nacelle according to claim 1, wherein the cowls are made of a composite material and the base plates are made of a metallic material.

4. The nacelle according to claim 3, wherein the base plates comprise end flanges for covering the lower edges of the cowls.

5. The nacelle according to claim 1, wherein the blocking member is formed by a third arm with a bumper at its end, the third arm being joined to the first or the second alignment arm in a rotatable manner of a predetermined amplitude around a shaft parallel to the lower edges of the cowls.

6. The nacelle according to claim 5, wherein the bumper is joined to the third arm in a rigid manner.

7. The nacelle according to claim 5, wherein the bumper comprises an elastomeric block and a protective jacket.

8. The nacelle according to claim 1, wherein:
   the first and second alignment arms are mounted on base plates; and
   the portions are protruding portions with respect to the base plates.

9. The nacelle according to claim 8, wherein an inner end of a third arm is joined to the base plate of the first or the second part through a compression spring to control the amplitude of its rotational movements.

10. The nacelle according to claim 8, wherein a lower edges of the protruding portions of the first and second alignment arms include a first section elevated with respect to a surface of the base plates and a second section inclined upwardly as a ramp.

* * * * *